(No Model.)
A. M. DENIG.
FRUIT PICKER'S BASKET OR CAN.
No. 570,385. Patented Oct. 27, 1896.
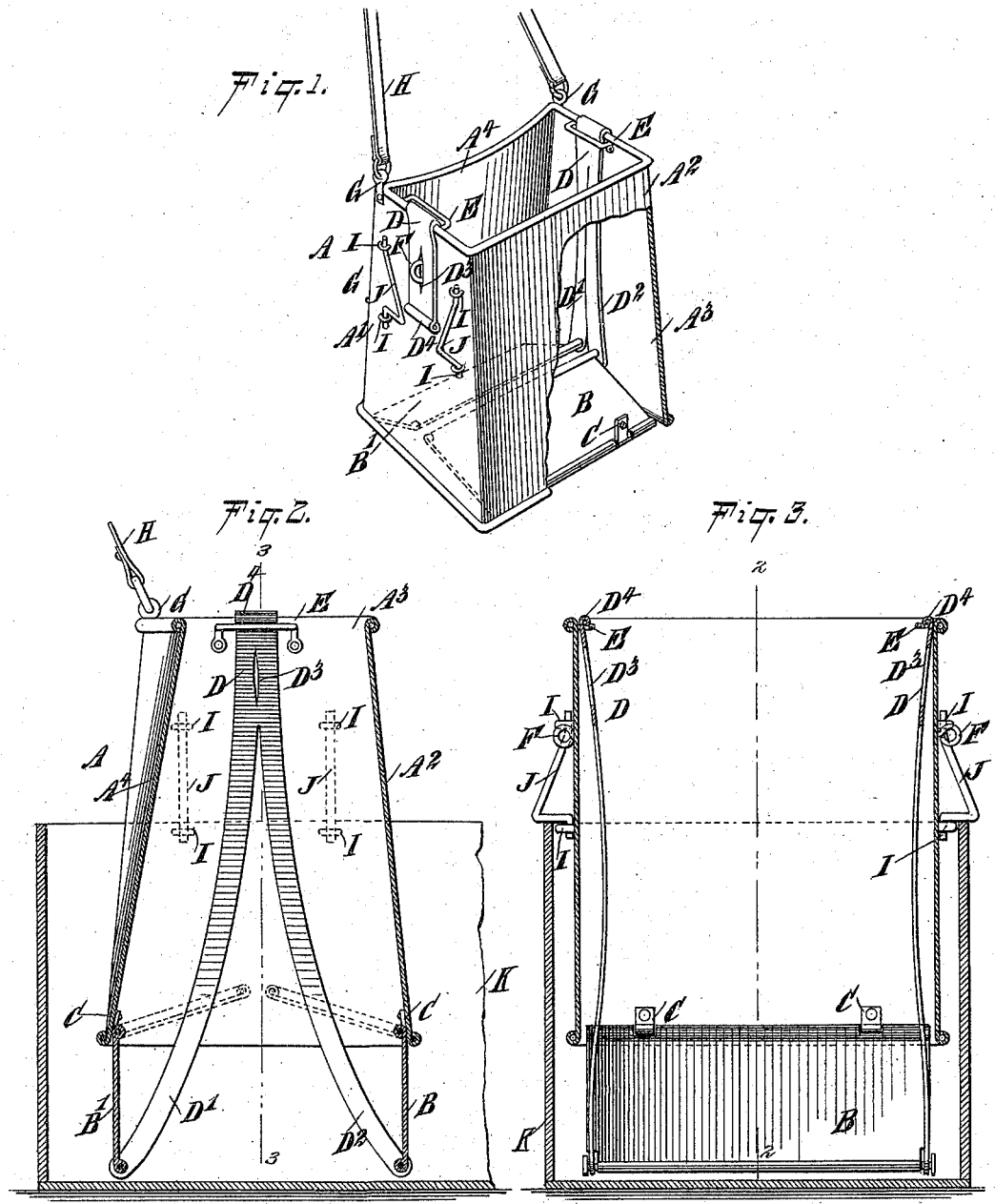
WITNESSES:
William P. Gaebel
Theo. G. Hostler
INVENTOR
A. M. Denig
BY Munn & Co.
ATTORNEYS.

UNITED STATES PATENT OFFICE.

AUGUSTUS M. DENIG, OF RIVERSIDE, CALIFORNIA.

FRUIT-PICKER'S BASKET OR CAN.

SPECIFICATION forming part of Letters Patent No. 570,385, dated October 27, 1896.

Application filed December 9, 1895. Serial No. 571,518. (No model.)

*To all whom it may concern:*

Be it known that I, AUGUSTUS M. DENIG, of Riverside, in the county of Riverside and State of California, have invented a new and Improved Fruit-Picker's Basket or Can, of which the following is a full, clear, and exact description.

The object of the invention is to provide a new and improved fruit-picker's basket or can which is simple and durable in construction and arranged to permit of quickly handling the picked fruit without danger of bruising the same.

The invention consists principally of a receptacle having converging sides, so as to increase the size of the receptacle toward the bottom.

The invention further consists of a receptacle provided with two hinged bottom sections, straps connected with the free ends of said bottom sections, and stops held on the sides of said receptacle and adapted to be engaged with the outermost ends of said straps.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a perspective view of the improvement with parts broken out. Fig. 2 is an enlarged transverse section of the same on the line 2 2 of Fig. 3, and Fig. 3 is a sectional side elevation of the improvement on the line 3 3 of Fig. 2.

The improved fruit-picker's basket or can consists of a receptacle A, preferably made of light sheet metal and having its sides A', A², A³, and A⁴ converging toward each other, so as to gradually increase the size of the receptacle from the top to the bottom. By this arrangement the fruit placed in the receptacle is not liable to bridge or lodge therein when the fruit is transferred from the receptacle to a box, as hereinafter more fully described. The side A⁴ is made convex, so as to fit snugly against the body of the picker. The sides of the receptacle are connected with each other by double-lapped seams at the corners, and the upper and lower ends of the sides are preferably wired, so as to make the receptacle strong and durable.

The bottom of the receptacle A is made in two hinged sections B and B', pivoted on brackets C, attached to the lower ends of the front and rear sides A² and A⁴. The free ends of the hinged sections are adapted to extend close to each other at the time the bottom is closed, and in order to hold the said hinged sections in a closed position I provide two straps D, passing through the loops E on the sides A' and A³ of the receptacle A. Each strap D is formed at its lower end with branch arms D' and D², engaging the free ends of the bottom sections B and B', at the sides thereof, close to the inner faces of the sides A' and A³ of the receptacle A. The straps D are also formed at their upper ends with slits D³.

When the straps D are in the position shown in Fig. 1, then the bottom sections B and B' are closed, and the outer ends of said straps pass to the outer faces of the sides A' and A³ to engage the slits D³ with stops F, secured to the sides A' and A³. By this arrangement the straps D are held in place and support the bottom sections B and B' in a closed position.

The extreme outer ends of the straps D are preferably doubled in to form an enlarged end D⁴, adapted to rest on the loops E at the time the bottom sections B and B' are in an open position. (See Figs. 2 and 3.) On the corners of the sides A⁴ A' A³ and at their upper ends are secured eyes G, engaged with the ends of shoulder-straps H for supporting the receptacle on the wearer's body.

On the outer faces of the sides A' and A³ are secured bearings I, in which are mounted to swing rests J, adapted to set on the top edge of the box K, in which the fruit is to be transferred from the receptacle A. The rests J are swung inward against the outer faces of the sides A' and A³ as long as the picker is filling the receptacle with the fruit, and when it is desired to empty the contents of the receptacle into the box K then the picker swings the rests J outward into the position shown in Fig. 3 to support the receptacle in the box K. By this arrangement the receptacle enters the proper distance into the box K to permit the bottom sections B and B' to swing completely open without touching the bottom of the box K. (See Figs. 2 and 3.)

It is understood that when the receptacle A is filled with the fruit and placed in position on the box K then the picker disconnects the outer ends of the straps D from the stops F to permit the bottom sections B and B' to swing downwardly into an open position by the weight of the fruit resting on the bottom sections. The fruit now readily passes from the receptacle A into the box K without danger of bruising or otherwise injuring it. The receptacle A is then lifted, and the picker again pulls on the ends $D^4$ of the straps D to move the bottom sections B and B' into a closed position, after which the straps are fastened at their outer ends to the stops F. The rests J are then swung inward against the faces of the sides A' and $A^3$ to present no projections while picking the fruit. It is understood that when the receptacle A is held on the box K the rests J relieve the picker from the weight of the filled receptacle while emptying the contents therefrom.

Having thus fully described my invention, I claim as new and desire to secure by Letters Patent—

1. A fruit-picker's basket or can, comprising a receptacle having a bottom made in two hinged sections, straps connected with the free ends of said sections, and each formed with an enlarged end, and loops held on the sides of the receptacle for the passage of said straps, said loops also forming seats for the enlarged ends of the straps at the time the bottom sections are open, substantially as shown and described.

2. A fruit-picker's basket or can, consisting of a receptacle having a hinged bottom, and rests held on the sides of said receptacle, and adapted to be seated on the box to be filled with the contents of said receptacle, substantially as shown and described.

3. A fruit-picker's basket or can, consisting of a receptacle, and stops hinged on the sides of said receptacle, and adapted to be folded thereon or extended therefrom at right angles to said sides, and rest on the top edge of the box to be filled with the contents of said receptacle, substantially as shown and described.

4. A fruit-picker's basket or can, comprising a receptacle having a bottom made in two sections hinged to opposite edges of the receptacle, straps having branches at their lower ends, said branches being connected with the free ends of the respective sections of the bottom, loops at the upper part of the receptacle through which said straps pass, said straps being provided with apertures in their upper ends, and stops on the outer sides of the receptacle adapted to pass through the apertures in the upper ends of the straps, to hold the sections of the bottom in a raised position, substantially as set forth.

AUGUSTUS M. DENIG.

Witnesses:
BELLE WARREN,
WILLIAM G. IRVING.